(12) United States Patent
Fukumura et al.

(10) Patent No.: US 6,634,450 B1
(45) Date of Patent: *Oct. 21, 2003

(54) VEHICLE DRIVETRAIN CONTROL SYSTEM

(75) Inventors: Tomohiro Fukumura, Yokohama (JP); Hitoshi Ono, Yokosuka (JP)

(73) Assignee: Nissan Motor Co., Ltd., Yokohama (JP)

(*) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 891 days.

(21) Appl. No.: 08/623,043

(22) Filed: Mar. 28, 1996

(30) Foreign Application Priority Data

Mar. 28, 1995 (JP) .............................. 7-069892

(51) Int. Cl.[7] .............................. B60K 31/00
(52) U.S. Cl. ................. 180/197; 364/426.02
(58) Field of Search .................. 180/197, 248, 180/249, 177; 280/91; 364/424.01, 424.05, 424.1, 426.01, 426.03

(56) References Cited

U.S. PATENT DOCUMENTS

| | | | | |
|---|---|---|---|---|
| 5,243,526 A | * | 9/1993 | Ito et al. | 364/426.02 |
| 5,262,950 A | * | 11/1993 | Nakayama | 364/424.05 |
| 5,269,391 A | * | 12/1993 | Ito et al. | 180/197 |
| 5,330,025 A | * | 7/1994 | Kamei | 180/170 |

* cited by examiner

*Primary Examiner*—Eileen D. Lillis
*Assistant Examiner*—R. B. Johnson
(74) *Attorney, Agent, or Firm*—Foley & Lardner

(57) ABSTRACT

During occurrence of slippage at drive wheels, a traction controller calculates a feedforward term of a desired drive engine torque as a sum of an accelerating resistance torque and a running resistance torque determined immediately before the occurrence of slippage. The traction controller calculates a feedback term of the desired drive torque as a function of a slip error from a desired value and determines a target engine torque in response to the feedforward and feedback terms and a speed ratio established in a transmission. The traction controller alters an engine torque modifier in the form of a throttle arranged upstream of an accelerator controlled throttle.

6 Claims, 5 Drawing Sheets

VEHICLE DRIVETRAIN CONTROL SYSTEM

BACKGROUND OF THE INVENTION

The present invention relates to a vehicle drivetrain control system.

With an intention to accelerate a vehicle, the vehicle operator manipulates an accelerator, such as a gas pedal. In this case, if a drive wheel contacts low μ(mu) surface and slips, the vehicle fails to speed up as quickly as expected. Slippage of the drive wheel can be suppressed by altering drive torque at the drive wheel. In an attempt to alter drive torque, the drive wheels can be braked and/or environment in which an engine operates can be modified in such a direction as to cause the engine to alter the engine torque.

Usually, the environment surrounding the engine is modified to suppress slippage of the drive wheel. In co-pending U.S. patent application Ser. No. 08/567,590 filed on Dec. 5, 1995, applicants have proposed to close, upon occurrence of slippage of drive wheel, a normally open throttle disposed upstream or downstream of a normally closed throttle, which opens in degrees in response to manipulation of an accelerator. The normally open throttle is closed in response to an engine torque modifier signal developed by a controller. The normally open throttle is adjusted to a desired opening degree including a feedforward term that is determined in the controller as a function of a longitudinal acceleration to which the vehicle is subject to during occurrence of slippage of drive wheel. With the position of the accelerator unchanged, longitudinal acceleration to which the vehicle is subject to varies with varying μ(mu) of road surface if the road surface is flat and the vehicle moves in a straight direction. According to this proposal, since, with the same μ(mu) surface, the same feedforward term is set over varying road condition, the feedforward term appropriate for driving on flat road surface would cause a reduction of engine torque than necesssary and inappropriate for driving on ascending road.

An object of the invention is to provide a vehicle drivetrain control system, that allows the vehicle to pass through road with varying μ(mu) surface under varying drive condition with less alteration in mobility.

SUMMARY OF THE INVENTION

According to the invention, there is provided a vehicle drivetrain control system including an engine operable in response to operator manipulation of an accelerator to output varying engine torque, an engine torque modifier operable in response to an engine torque modifier signal for modifying environment in which the engine operates in such a direction as to cause a change in engine torque output by the engine, and a controller means for developing the engine torque modifier signal for operating the engine torque modifier in response to slippage of drive wheel of the vehicle, wherein the controller means determines resistance to which the vehicle moves, and the controller means develops the engine torque modifier signal in response to the determined resistance.

DETAILED DESCRIPTION OF THE INVENTION

Figure 1:
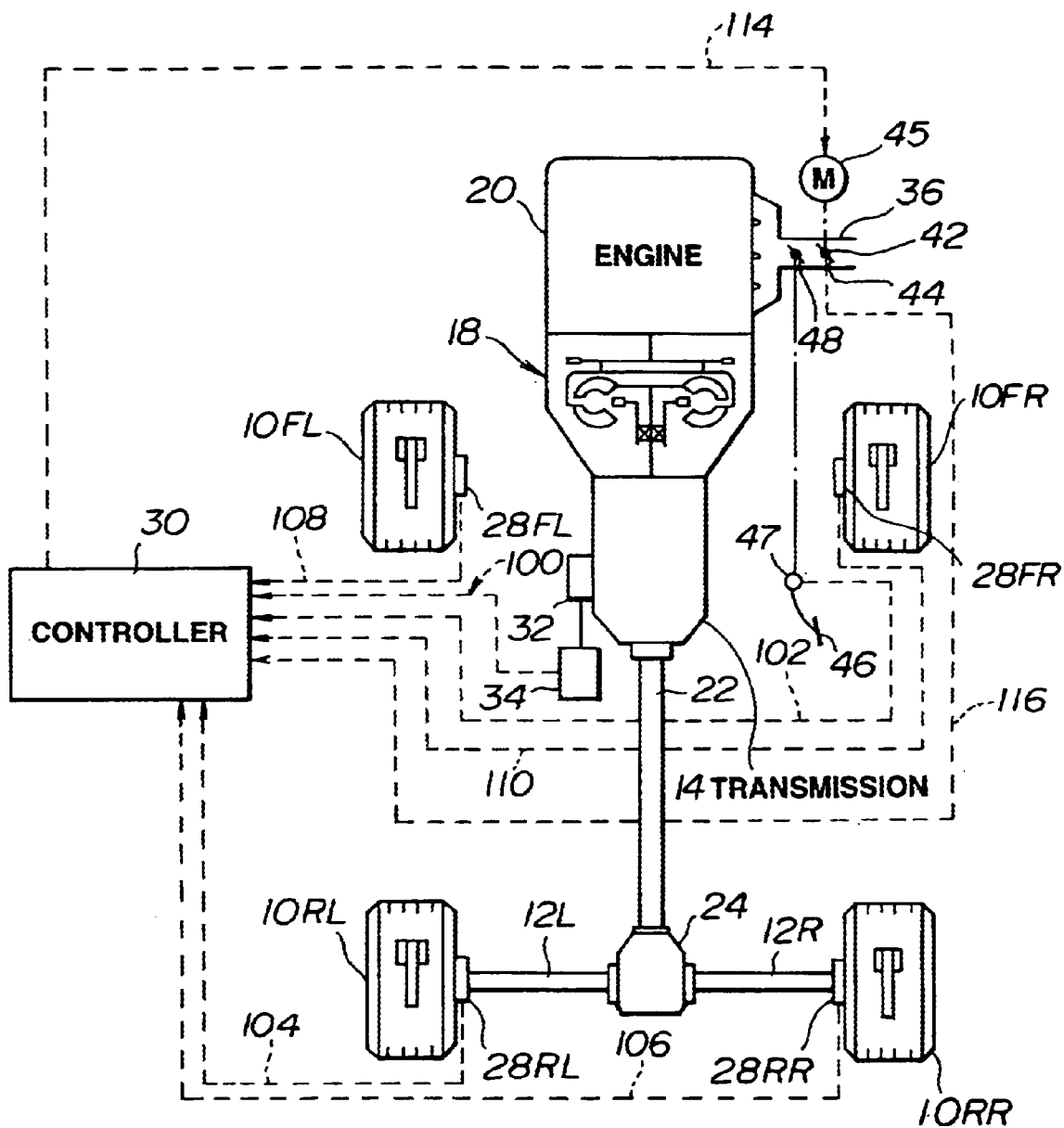
FIG. 1 is a block diagram showing the relationship between the controller, the torque converter, the transmission, the differential gear and the pair of drive wheels.

Referring to FIG. 1, a vehicle drivetrain includes a prime mover in the form of an internal combustion engine 20 with a normally closed throttle 48 disposed within an intake pipe 36 and opens in degrees in response to the vehicle operator manipulation of an accelerator in the form of a gas pedal 46, a torque converter 18, a transmission in the form of an automatic transmission 14 having an input shaft drivingly connected to the engine 20 via the torque converter 18 and an output shaft drivingly connected to rear drive wheels 10RL and 10RR via a propeller shaft 22, a differential gear 24 and rear axles 12L and 12R. Designated by the numerals 10FL and 10FR are front follower wheels, respectively.

The automatic transmission 14 has a hydraulic control system 32 and an A/T (automatic transmission) controller 34. The hydraulic control system 32 serves as a ratio controller for establishing various speed ratios between the transmission input and output shafts in response to a speed ratio control signal developed by the A/T controller 34. In the A/T controller 34, the speed ratio control signal is developed after comparing a desired speed ratio and an actual speed ratio i (=Ni/No). The speed Ni of the input shaft or turbine shaft of the torque converter 18 is sensed by a sensor, not shown, or determined as a function of the engine speed Ne and the characteristic of the torque converter 18. The speed No of the output shaft is sensed by a sensor, not shown. The A/T controller 34 communicates information with an engine controller, not shown, for the engine 20 so that the A/T controller 34 receives information as to the engine speed Ne from the engine controller and thus can provide not only information as to the actual speed ratio i, but also information as to the engine speed Ne to a traction controller 30 through lines generally designated as 100.

A gas pedal sensor 47 detects a position to which the accelerator or gas pedal 46 is depressed at and provides an accelerator depression degree signal A to the traction controller 30 through line 102. This signal A is indicative of degree to which the gas pedal 46 is depressed by the vehicle operator and thus represents the operator manipulation, i.e., power command, of the gas pedal 46. Wheel speed sensor 28RL is arranged to detect wheel speed at which the rear left drive wheel 10RL turns and provides wheel speed signal $V_{WRL}$ to the traction controller 30 through line 104. Wheel speed sensor 28RR is arranged to detect wheel speed at which the rear right drive wheel 10RR turns and provides wheel speed signal $V_{WRR}$ to the traction controller 30 through line 106. In order for the traction controller 30 to determine vehicle speed at which the vehicle moves, wheel speed sensors 28FL and 28FR are arranged to detect wheel speed at which the front left follower wheel 10FL turns and wheel speed at which the front right follower wheel 10FR turns, respectively. Wheel speed sensor 28FL provides wheel speed signal $V_{WFL}$ to the traction controller 30 through line 108. Wheel speed sensor 28FR provides wheel speed signal $V_{WFR}$ to the traction controller 30 through line 110.

Figure 4:
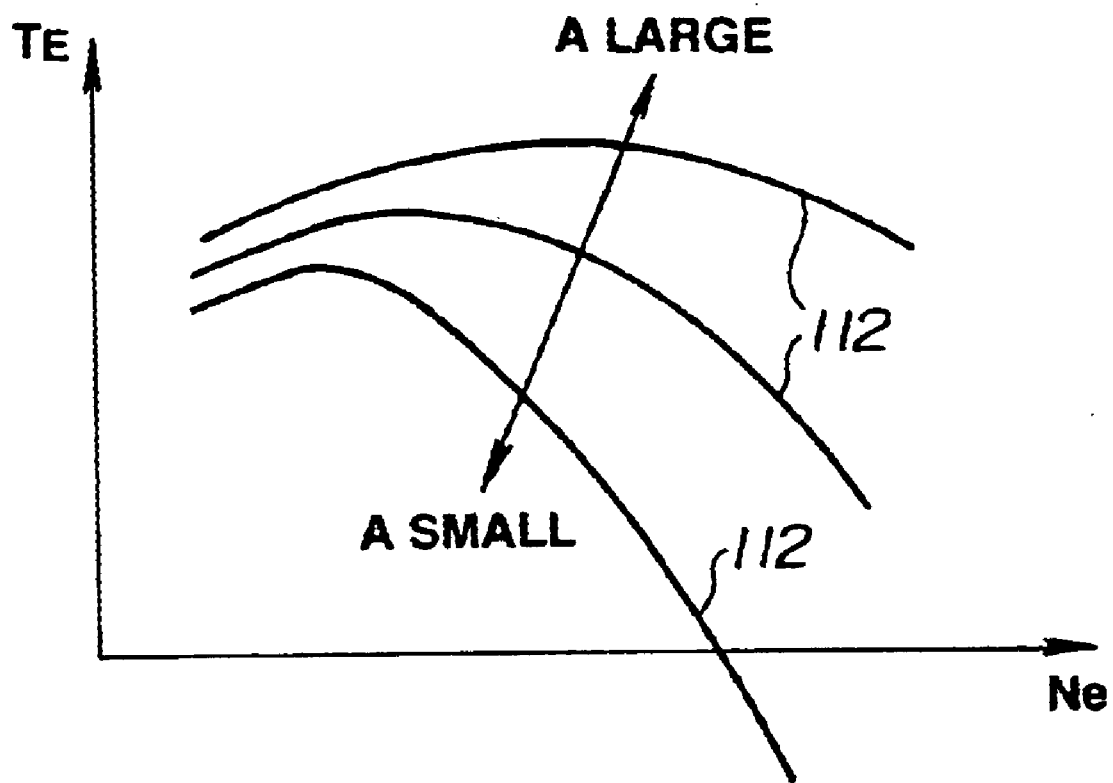
FIG. 4 is an engine map illustrating how the engine output alters against varying engine speed for each of different degrees to which the accelerator is depressed.

The engine 20 operates in response to the vehicle operator manipulation of the accelerator 46 as indicated by the accelerator depression degree signal A to output varying engine torque as illustrated in FIG. 4. In FIG. 4, the vertical axis represents the engine torque $T_E$ and the horizontal axis represents the engine speed Ne. Fully drawn curves 112 are constant accelerator depression degree curves. As seen from a double headed arrow, the engine torque $T_E$ increases as the acclerator depression degree A becomes large, while it decreases as the accelerator depression degree A becomes small.

The engine torque variation illustrated in FIG. 4 can be modified by an engine torque modifier. The engine torque modifier modifies environment in which the engine 20 operates. This function may be, for example, performed by increasing the amount of the engine spark retard to cause a drop in the engine torque or suspending supply of fuel to at least a portion of the engine cylinders to cause a drop in the engine torque. In FIG. 1, this function is performed by a normally open throttle 44 disposed in the intake pipe 36 upstream of the normally closed throttle 48. The normally open throttle 44 can be moved to any desired opening degree by an actuator in the form of a stepping motor 45 in response to an engine torque modifier signal supplied to the stepping motor 45 through line 114. Throttle sensor 42 is arranged to detect the actual opening degree of the normally open throttle 44 and provides a throttle opening degree signal TH indicative of the detected actual throttle opening degree to the traction controller 30 through line 116.

In the traction controller 30, a microcomputer 84 includes a central processor unit (CPU) 84c, an input interface circuit 84a, an output interface circuit 84b, and a memory 84d. The CPU 84c controls the input and output interface circuits 84a and 84b and the memory 84d through control bus. Bi-directioal data bus provides for the transfer of data between the input and output interface circuits 84a and 84b, the memory 84d and the CPU 84c. Line 104 carries the wheel speed signal $V_{WRL}$ in the form of pulses whose frequency represents wheel speed of the rear left drive wheel 10RL. Line 106 carries the wheel speed signal $V_{WRR}$ in the form of pulses whose frequency represents wheel speed of the rear right drive wheel 10RR. Line 108 carries the wheel speed signal $V_{WFL}$ in the form of pulses whose frequency represents wheel speed of the front left follower wheel 10FL. Line 110 carries the wheel speed signal $V_{WFR}$ in the form of pulses whose frequency represents wheel speed of the front right follower wheel 10FR. The lines 104, 106, 108 and 110 are fed into frequency to voltage (F/V) converters 81RL, 81RR, 81FL and 81FR in the traction controller 30, respectively. Voltage outputs of these F/V converters 81RL, 81RR, 81FL and 81FR are fed to analog to digital (A/D) converters 82RL, 82RR, 82FL and 82FR in the traction controller 30, respectively. Digital outputs of the A/D converters 82RL, 82RR, 82FL and 82FR are fed to the input interface circuit 84a. Line 102 carries the accelerator depression degree signal A in the form of voltage signals. Line 116 carries the throttle opening degree signal TH in the form of voltage signal. The lines 102 and 116 are fed into A/D converters 83B and 83C in the traction controller 30, respectively. Digital outputs of these A/D converters 83B and 83C are fed to the input interface circuit 84a. Lines 100 transfer information as to the speed ratio i and information as to the engine speed Ne. The lines 100 are fed to the input interface circuit 94a.

The output interface circuit 84b controls a stepping motor drive circuit 89. The motor drive circuit 89 provides the torque modifier signal to the stepping motor 45 through the line 114.

It will be noted that the present invention is not limited to the use of the transmission having discrete speed or gear ratios. The present invention is operational with any types of continuously variable transmission CVT. It will also be noted that the present invention may be operational with a vehicle drivetrain including an electric motor coupled directly with the differential gear 24. In this drivetrain, an engine, a torque converter, and a transmission are not used.

A preferred implementation of the present invention can be understood with reference to timing diagrams in FIGS. 5A, 5B, 5C and 5D.

Let it be assumed that the vehicle is being accelerated on an ascending road having a constant gradient. The road has a region with low $\mu$(mu) surface. The traction controller 30 may determine the vehicle speed in a manner as employed in an anti-skid brake control system in determining pseudo-vehicle speed. In this preferred implementation, the traction controller 30 employs an instantaneous average of wheel speeds of the front follower wheels 10FL and 10FR. The equation of this average can be expressed as:

$$V_{WF(n)} = (V_{WFL} + V_{WFR})/2 \qquad (1)$$

where $V_{WF(n)}$ is the instantaneous average, $V_{WFL}$ is the instantaneous wheel speed of the front left follower wheel 10FL, and $V_{WFR}$ is the instantaneous wheel speed of the front right follower wheel.

The average $V_{WF(n)}$, which can be regarded as the vehicle speed, is compared with an instantaneous average of wheel speeds of the rear drive wheels 10RL and 10RR. The equation of this average can be expressed as:

$$V_{WR(n)} = (V_{WRL} + V_{WRR})/2 \qquad (2)$$

where $V_{WR(n)}$ is the instantaneous average, $V_{WRL}$ is the instantaneous wheel speed of the rear left drive wheel 10RL, $V_{WRR}$ is the instantaneous wheel speed of the rear right drive wheel 10RR.

The traction controller 30 determines the slippage of the drive wheels 10RL and 10RR. The equation of the slippage can be expressed as:

$$S(n) = V_{WR(n)} - V_{WF(n)} \qquad (3)$$

where S(n) is the instantaneous slip speed or amount. If desired, the slippage may be expressed by a ratio $S(n)/V_{WF(n)}$.

The traction controller 30 compares the instantaneous slip amount S(n) with an upper reference value $S_0$ and initiates a so-called "drive torque control mode" at a moment when the instantaneous slip amount S(n) exceeds the upper reference value $S_0$. This drive torque control mode is completed at a later moment when the instantaneous slip amount S(n) drops below a lower reference value $S_1$ that is lower than $S_0$.

Figure 5A:
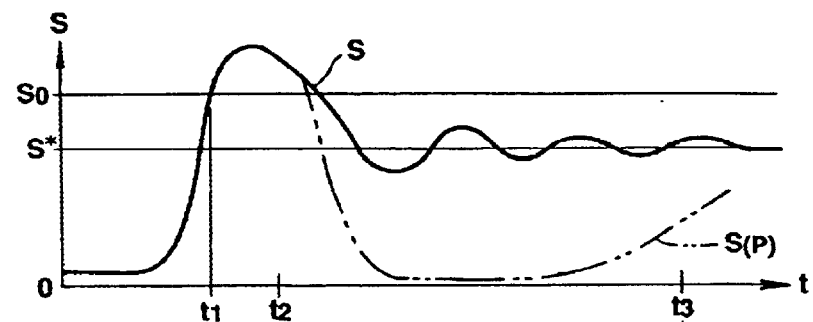
FIGS. 5A, 5B, 5C, and 5D are graphs illustrating how the longitudinal acceleration, the opening degree of the normally open throttle and the average of wheel speeds of the drive wheels change upon and after the actual slip has exceeded a reference slip.

FIG. 5A illustrates that, at the moment $t_1$, the instantaneous slip amount S(n) exceeds the upper reference value $S_0$ and the drive torque control mode begins.

The traction controller 30 determines the vehicle acceleration, i.e., a longitudinal acceleration to which the vehicle is subject to. The vehicle acceleration may be sensed by a sensor such as a vehicle mount accelerometer. In this preferred implementation of the invention, the traction controller 30 determines the vehicle acceleration as the first derivative of $V_{WF(n)}$ with respect to time. The equation of the vehicle acceleration can be expressed as:

$$Xg = \{V_{WF(n)} - V_{WF(n-1)}\}/\Delta T_{S2} \qquad (4)$$

where Xg is the vehicle longitudinal acceleration, $V_{WF(n)}$ is the recently input value of the average, $V_{WF(n-1)}$ is the previously input value of the average a predetermined period of time $\Delta T_{S2}$ ago, and $\Delta T_{S2}$ the predetermined period of time.

The traction controller 30 uses the vehicle acceleration Xg to determine torque opposed to the vehicle accelerating resistance. This torque is referred to as "accelerating resistance torque." The equation of the accelerating resistance torque can be expressed as:

$$T_X = W \cdot R\{1 + I \cdot g(W \cdot R^2)^{-1}\} Xg \cdot g^{-1} \qquad (5)$$

where $T_X$ is the accelerating resistance torque, W is the weight of the vehicle, R is the rolling radius of drive wheel, I is the drivetrain inertia moment, and g is the gravitational acceleration.

The traction controller 30 determines torque opposed to the vehicle running resistances other than the accelerating resistance. This torque is referred to as "running resistance torque." The equation of the running resistance torque can be expressed as:

$$T_{R(n)} = K_{P1} \cdot f_1(V_{WF}^2) + K_{P2} \cdot f_2(Yg) + K_{P3} \cdot g \cdot \sin \alpha \qquad (6)$$

where $T_R$ is the vehicle running resistance torque, $K_{P1}$, $K_{P2}$, and $KP_3$ are the predetermined coefficients, $f_1$ represents the function to determine the air resistance, $f_2$ is the cornering resistance, Yg is the vehicle lateral acceleration sensed by a sensor, α (alpha) is the angle of inclination of the inclined road sensed by a sensor.

Since this equation requires, the additional sensors for sensing the vehicle lateral acceleration and the angle of inclination, the traction controller 30 car determine the running resistance torque in a different manner as explained below.

The traction controller 30 has stored in the memory 84d an engine torque look-up table containing various engine torque data $T_E$ versus various combinations of accelerator depression degree A and the engine speed Ne as illustrated in FIG. 4. The equation of the drive torque can be expressed as:

$$T_D = \times T_E(A, Ne) \qquad (7)$$

where $T_D$ is the drive torque, i is the speed or gear ratio in the transmission 14, $T_E$(A, Ne) is the engine torque resulting from performances a table look-up operation of the engine torque look-up table against the accelerator depression degree A and the engine speed Ne, and A is the accelerator pedal depression degree.

Using the drive torque $T_D$ and the accelerating resistance torque $T_X$, drive torque loss, i.e., the running resistance torque $T_{R(n)}$ opposed to running resistance excluding the accelerating resistance can be expressed as:

$$T_{R(n)} = T_D - T_X \qquad (8)$$

where $T_{R(n)}$ is the instantaneous value of the running resistance torque.

Immediately after the moment $t_1$ when the slip amount S exceeds the upper reference value $S_0$, the traction controller 30 determines the desired drive torque including a feedforward term and a feedback term.

The equation of the feedforward term of the desired drive torque can be expressed as:

$$T_{FF} = T_X + T_{R(n)} \qquad (9)$$

$T_{FF}$ is the feedforward term of the desired drive torque, $T_X$ is the instantaneous value of the accelerating resistance torque, and $T_{R(n)}$ is the value of the running resistance torque determined immediately before the moment $t_1$. It is to be noted that, during the drive torque control mode, the running resistance torque $T_{R(n)}$ determined immediately before the moment $t_1$ is kept used in calculating the feedforward term $T_{FF}$, while the instantaneous accelerating resistance torque $T_X(n)$ is used in calculating the feedforward term $T_{FF}$.

After the moment $t_1$, the traction controller 30 determines a slip error or difference between the actual slip amount S(n) with the desired value S*. This desired value S* is a predetermined value falling in a window defined by the upper and lower references $S_0$ and $S_1$. The equation of this error can be expressed as:

$$\Delta S(n) = S(n) - S^* \qquad (10)$$

where $\Delta S(n)$ is the instantaneous slip error.

The equation of the feedback term of the desired drive torque can be expressed as:

$$T_{FB(n)} = T_{FB(n-1)} - K_P\{\Delta S(n) - \Delta S(n-1)\} - K_I \cdot \Delta S(n) \qquad (11)$$

where $T_{FB(n)}$ is the instantaneous value of the feedback term, $T_{FB(n-1)}$ is the previous value of the feedback term determined the predetermined period of time $\Delta T_{S2}$ ago, $K_P$ is the proportional gain, $\Delta S(n)$ is the instantaneous value of the slip error, $\Delta S(n-1)$ is the previous value of the slip error determined to the predetermined period of time $\Delta T_{S2}$ ago, and $K_I$ is the integral gain.

Using the feedforward term $T_{FF}$, the feedback term $T_{FB(n)}$ and the speed ratio i, the traction controller 30 determines the desired engine torque. The equation of the desired engine torque can be expressed as:

$$T_E^* = \{T_{FB(n)} + T_{FF}\}/i \qquad (12)$$

where $T_E^*$ is the desired engine torque.

The traction controller 30 has stored in the memory 84d a throttle position look-up table containing the desired throttle position data against various combinations of the engine torque and the engine speed. This look-up table can be produced from the engine performance curves of the engine 20. The equation of the desired throttle position can be expressed as:

$$\theta^*(n) = \theta^*(T_E^*, Ne) \qquad (13)$$

where $\theta^*(n)$ is the instantaneous desired throttle position, and $\theta^*(T_E^*, Ne)$ is the value resulting from performing a table look-up operation of the throttle position table versus the desired engine torque $T_E^*$ and the instantaneous engine speed Ne.

Figure 2:
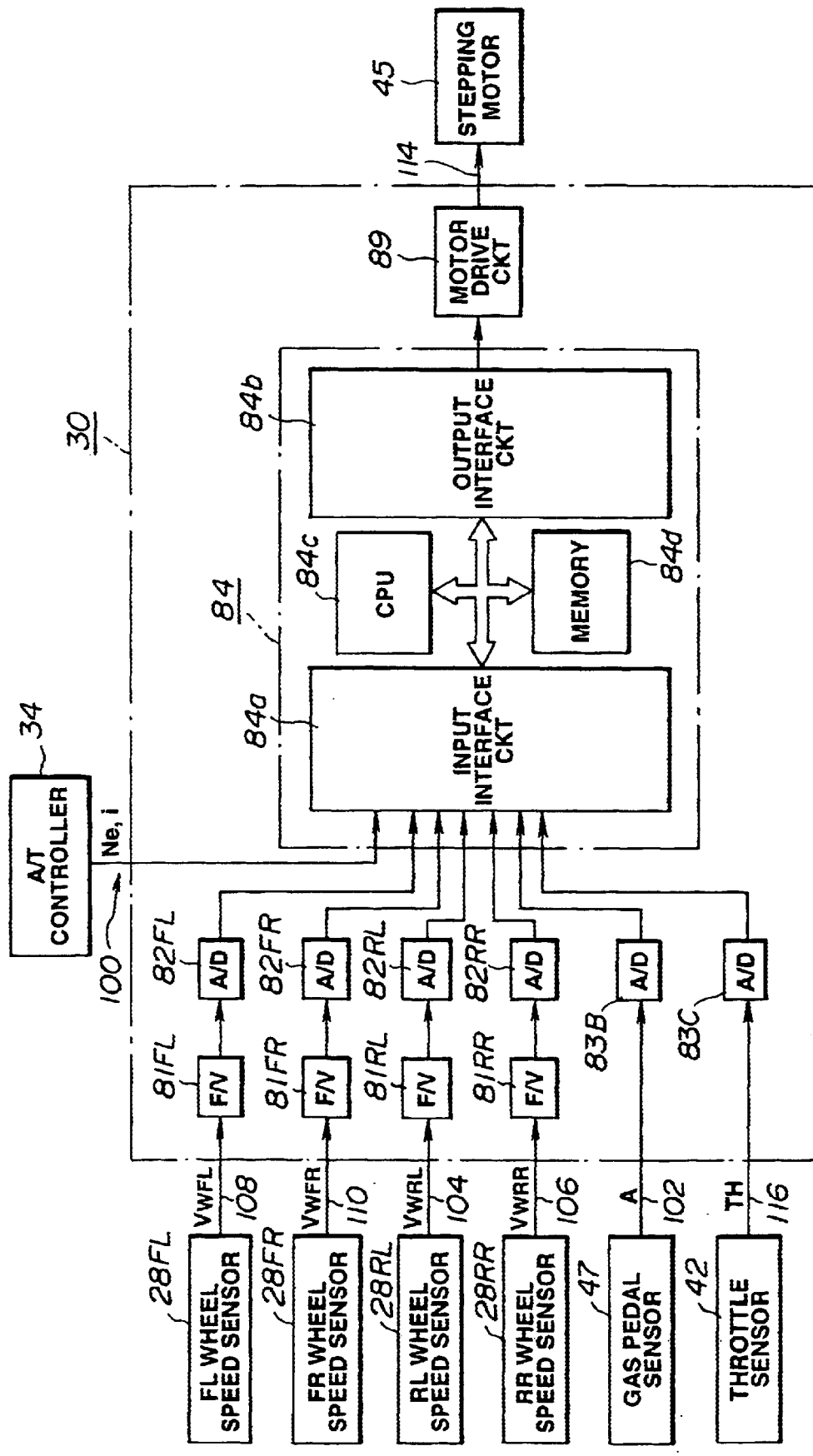
FIG. 2 is a block diagram showing the relationship between the controller, the sensors including wheel speed sensors, the A/T (automatic transmission) controller and the stepping motor as an actuator for the normally open throttle.

The traction controller 30 compares the instantaneous value of the desired throttle position $\theta^*(n)$ with the actual throttle opening TH sensed by the throttle sensor 42 and provides the torque modifier signal to the line 114 (see FIGS. 1 and 2) to cause the stepping motor 45 to move the throttle 44 in such a direction as to reduce a throttle position error between the desired and actual throttle positions toward zero.

Figure 5B:
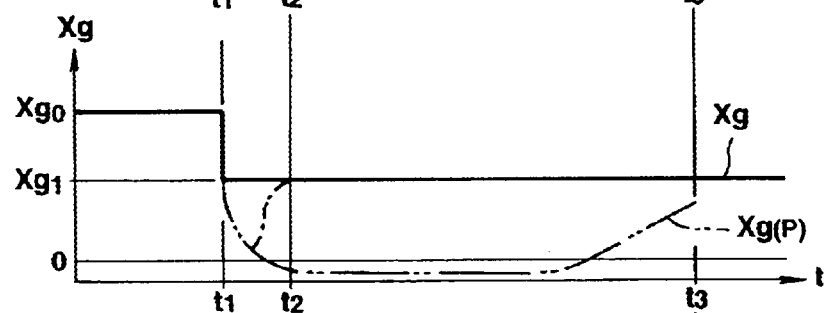

In FIG. 5B, the vertical axis represents the vehicle longitudinal acceleration Xg, and the horizontal axis represents time t. On this vertical axis, Xg0 is the acceleration value before the drive torque control mode and Xg1 is the acceleration value established in the drive torque control mode after the actual slip amount S has approached the desired value S*. The fully drawn line represents diagrammatically a change of the vehicle acceleration Xg after the drive torque control mode has been initiated according the preferred implementation of the invention. The one-dot chain line shows actual transient change of the vehicle acceleration. From this one-dot chain line, it will be noted that the vehicle longitudinal acceleration drops below the value Xg1 after the moment $t_1$ and then approaches the value Xg1 at the moment $t_2$.

Figure 5C:
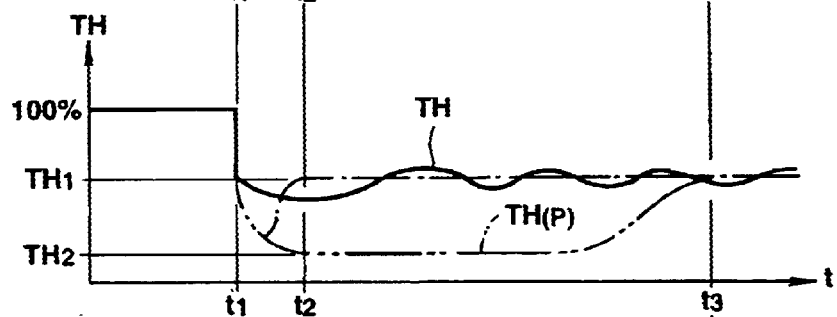

In FIG. 5C, the vertical axis represents the actual throttle opening degree TH of the normally open throttle 44 in terms of percent, and the horizontal axis represents time t. The fully opened position of the throttle 44 is expressed by 100%. Thus, as the throttle opening degree TH decreases, the percent decreases from 100%. On the vertical axis, TH1 is the value of the desired throttle opening degree $\theta^*(n)$ after the slip error (S–S*) has reduced to zero to cause the feedback term $T_{FB}$ to become zero. In FIG. 5C, the one-dot chain line diagrammatically illustrates variation of the desired throttle opening degree $\theta^*(n)$ after entry into the drive torque control mode, while the fully drawn line represents variation of the actual throttle opening degree TH before and after the moment $t_1$. From the one-dot chain line, it will be noted that the desired throttle opening $\theta^*(n)$ drops below the value TH1 during the time between the moments $t_1$ and $t_2$.

Figure 5D:
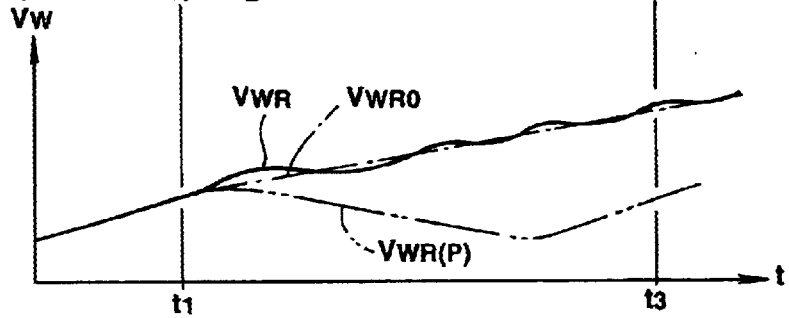

In FIG. 5D, the vertical axis represents the wheel speed $V_W$, and the horizontal axis represents time t. The fully drawn line illustrates variation of the average $V_{WR}$ of the rear wheel speeds before and after the moment $t_1$. The one-dot chain line $V_{WR}0$ represents the variation of the vehicle speed after the moment $t_1$.

From comparison of the gradient of the fully drawn line before the moment $t_1$ and that of the one-dot chain line $V_{WR}0$ after the moment $t_1$, it will be appreciated that, according to the preferred implementation of the invention, the vehicle can be accelerated after entry into the drive torque control mode without noticeable change in mobility.

In order to illustrate how the running resistance torque $T_{R(n)}$ is expressed by the equation (8) ratio, a less preferred implementation has been conceived. According to this less preferred implementation, the running resistance torque $T_R(n)$ in the equation (9) is set equal to zero and thus the feedforward term $T_{FF}$ is always set equal to the accelerating resistance torque $T_X$ in the drive torque control mode.

In FIGS. 5A, 5B, 5C and 5D, the two-dot chain lines S(P), Xg(P), TH(P), and $V_{WR(P)}$ are drawn to explain this less preferred implementation. The two-dot chain line TH(P) in FIG. 5C illustrates the variation of the desired throttle opening degree $\theta^*(n)$ after entry into the drive torque control mode. From comparison of this two-dot chain line TH(P) with one-dot chain line, it will be noted that, in the less preferred implementation, the desired throttle opening degree drops deeply more than it does in the preferred implementation of the invention immediately after the moment $t_1$. As seen from the two-dot chain line TH(P), the desired throttle opening degree drops down to a value TH2 and stays below the value TH1 longer than it does in the case of the preferred implementation of the invention. The desired throttle opening degree stays lower than the value TH1 for the period of time from the moment $t_1$ to the moment $t_3$. The two-dot chain line Xg(P) in FIG. 5B shows the variation of the vehicle longitudinal acceleration after entry into the drive torque control mode according to the less preferred implementation. The two-dot chain line $V_{WR(P)}$ in FIG. 5D shows the variation of the vehicle speed after entry into the drive torque control mode. The two-dot chain line S(P) in FIG. 5(A) shows the variation of the slip amount after entry into the drive torque control mode. The two-dot chain line $V_{WR(P)}$ in FIG. 5D clearly shows that there occurs a noticeable change in acceleration feel after entry into the drive torque control mode in the case of less preferred implementation.

Figure 3:
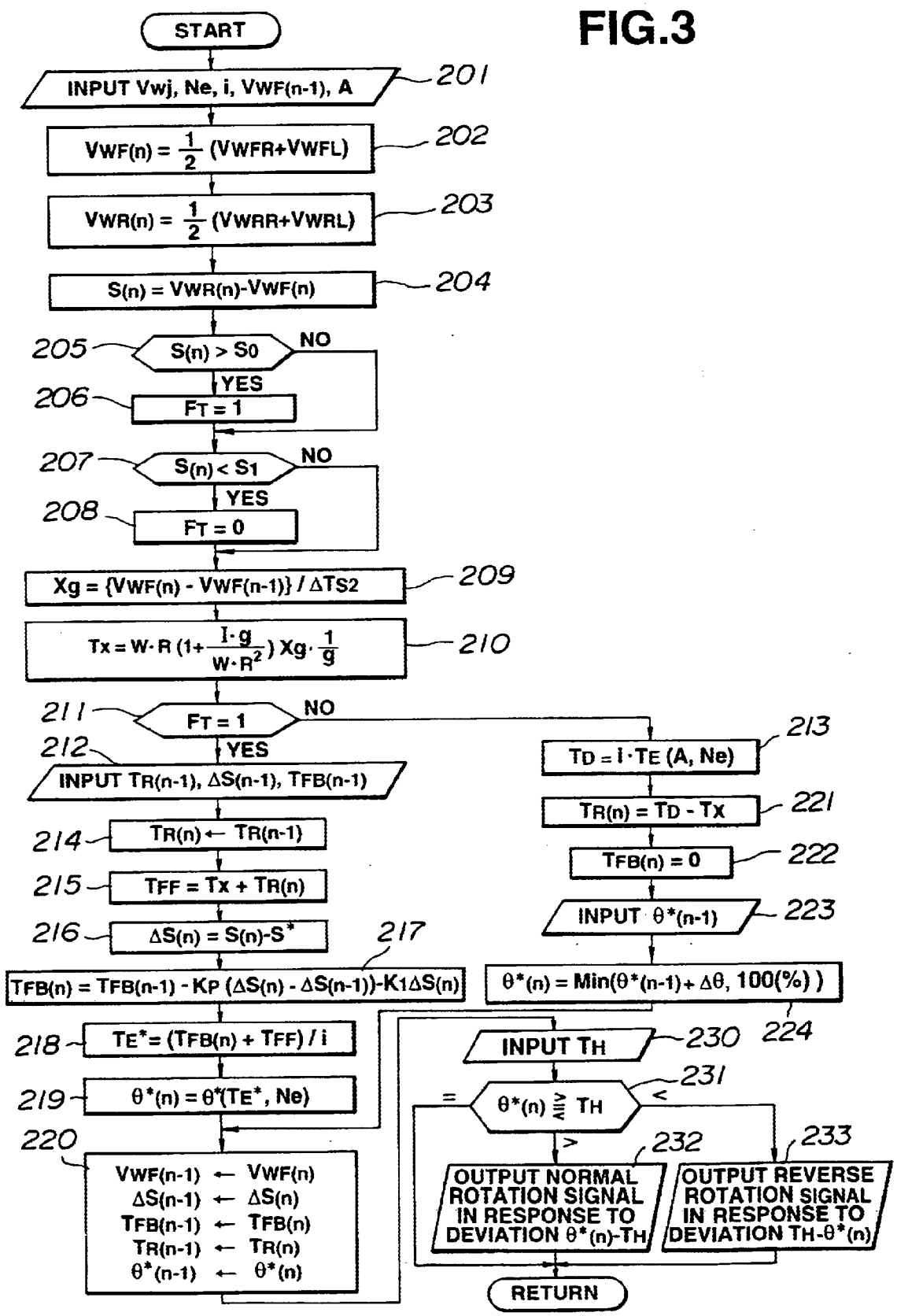
FIG. 3 is a flow chart of a control routine implementing the invention.

The flow diagram of FIG. 3 illustrates a control routine of the preferred implementation of the present invention. The traction controller 30 repeats execution of the control routine at regular intervals upon elapse of the period of time $\Delta T_{S2}$. At input box 201, the traction controller 30 inputs information of wheel speeds, engine speed, transmission speed ratio and accelerator depression degree as $V_{Wj}$ (suffix j represents FL, FR, RL and RR), Ne, i and A, respectively. At this input box 201, the traction controller 30 inputs old data $V_{WF(n-1)}$, which is the previous value of the average calculated by the equation (2) the period of time $\Delta T_{S2}$ ago.

In box 202, the traction controller 30 computes the average $V_{WF(n)}$ from wheels speeds $V_{WFR}$ and $V_{WFL}$ by calculating the equation (1). In box 203, the traction controller 30 computes the average $V_{WR(N)}$ from wheel speeds $V_{WRR}$ and $V_{WFL}$ by calculating the equation (2). In box 204, the traction controller 30 computes the slip amount S(n) from the averages $V_{WR(n)}$ and $V_{WF(n)}$ by calculating the equation (3). The traction controller 30 next determines, at box 205, whether the slip amount S(n) is greater than the upper reference value $S_0$ or not.

Before the moment $t_1$, the slip amount S(n) is less than the upper reference value $S_0$ so that the traction controller 30 next determines at box 207 whether the slip amount S(n) is less than the lower reference value $S_1$ or not. If S(n) is less than the lower reference value $S_1$, the traction controller 30 next resets, at box 208, a torque control status flag $F_T$ equal to zero.

The vehicle longitudinal acceleration Xg is computed at box 209 from the new data of the average $V_{WF(n)}$ and the old data of the average $V_{WF(N-1)}$ by calculating the equation (4). The accelerating resistance torque $T_X$ is computed, at box 210, by calculating the equation (5).

The traction controller 30 next determines, at box 211, whether the flag $F_T$ is equal to 1 or not. Before the moment $t_1$, the flag $F_T$ is equal to zero and the traction controller 30 computes the drive torque $T_D$ from the speed ratio i and the engine torque $T_E$ by calculation the equation (7). At box 213, the engine torque $T_E$ is given after performing a table look-up operation of the engine torque look-up table as illustrated in FIG. 4. At box 221, the running resistance torque $T_{R(n)}$ is computed from the drive torque $T_D$ and the accelerating resistance torque $T_X$ by calculating the equation (8). At next box 222, the feedback term $T_{FB(n)}$ is set equal to zero. The traction controller 30 next inputs, at box 223, the last data of desired throttle opening degree $\theta^*(n-1)$ obtained in the preceding execution of the control routine. At box 224, a smaller one of a sum of the data $\theta^*(n-1)$ and a predetermined throttle opening speed $\Delta\theta$ (delta $\theta$) and 100% is set as the current data of the desired throttle opening degree $\theta^*(n)$.

The traction controller 30 updates, at box 220, last data of $V_{WF(n-1)}$, $\Delta S(n-1)$, $T_{FB(n-1)}$, $T_{R(n-1)}$ and $\theta^*(n-1)$ by new data $V_{WF(n)}$, $\Delta S(n)$, $T_{FB(n)}$, $T_{R(n)}$ and $\theta^*(n)$, respectively. The traction controller 30 next inputs, at box 230, the information of the actual throttle opening degree as TH.

At box 231, the new data of the actual throttle opening degree TH is compared with the new data of the desired throttle opening degree $\theta^*(n)$. If the traction controller 30 determines that TH is equal to $\theta^*(n)$, the traction controller 30 completes the execution of the control routine. If TH is less than $\theta^*(n)$, the traction controller 30 outputs, at box 232, normal rotational signal in response to deviation θ*(n)–TH to the motor driver circuit 89 before completion of the execution of the control routine. If TH is greater than θ*(n), the traction controller 30 outputs, at box 233, reverse rotational signal in response to deviation TH–θ*(n) to the motor driver circuit 89 before completion of the execution of the control routine.

Before the moment $t_1$, 100% is set as θ*(n). Thus, the stepping motor 45 holds the throttle 44 at the fully open throttle position of 100%.

Immediately after the moment $t_1$, the traction controller 30 determines, at box 205, that the slip amount S(n) is greater than the upper reference S and next sets, at box 206, the traction, flag $F_T$ equal to 1. The traction controller 30 passes box 208 and computes, at boxes 209 and 210, the vehicle longitudinal acceleration Xg and the accelerating resistance torque $T_X$.

Since, at box 211, it determines that the torque control flag $F_T$ is equal to 1, the traction controller 30 inputs, at box 212, the last data $T_{R(n-1)}$, ΔS(n–1) and $T_{FB(n-1)}$. At box 214, the data $T_{R(n)}$ is updated by the last data $T_{R(n-1)}$.

The traction controller 30 next computes, at box 215, the feedforward term $T_{FF}$ from the accelerating resistance torque T and the data $T_{R(n)}$ by calculating the equation (9). At box 216, the slip error ΔS(n) is computed from the data S(n) and the desired slip value S* by calculating the equation (10). At next box 217, the feedback term $T_{FB(n)}$ is computed by calculating the equation (11). At box 218, the desired engine torque $T_E^*$ is computed from the feedback term $T_{FB(n)}$, feedforward term $T_{FF}$ and speed ratio i by calculating the equation (12). At box 219, the desired throttle position θ*(n) is determined from the equation (13) by performing a table look-up operation of the throttle position tablet.

The traction controller 30 next updates, at box 220, last data of $V_{WF(n-1)}$, ΔS(n–1), $T_{FB(n-1)}$, $T_{R(n-1)}$ and θ*(n–1) by new data $V_{WF(n)}$, ΔS(n), $T_{FB(n)}$, $T_{R(n)}$ and θ*(n), respectively. The traction controller 30 next inputs, at box 230, the information of the actual throttle opening degree as TH.

At box 231, the new data of the actual throttle opening degree TH is compared with the new data of the desired throttle opening degree θ*(n). If the traction controller 30 determines that TH is equal to θ*(n), the traction controller 30 completes the execution of the control routine. If TH is less than θ*, the traction controller 30 outputs, at box 232, normal rotational signal in response to deviation θ*(n)–TH to the motor driver circuit 89 before completion of the execution of the control routine. If TH is greater than θ*(n), the traction controller 30 outputs, at box 233, reverse rotational signal in response to deviation TH–θ*(n) to the motor driver circuit 89 before completion of the execution of the control routine.

In this manner, in the drive torque control mode, the actual throttle opening degree TH of the throttle 44 is adjusted to the desired throttle opening degree θ*(n) determined at box 219 each time upon execution of the control routine after the moment $t_1$.

If, at a later moment, the slip amount S drops below the lower reference value $S_1$, the traction controller 30 resets, at box 208, the torque control status flag $F_T$ equal to zero during execution of the control routine immediately after this moment. Thus, the traction controller 30 goes from box 211 to boxes 213, 221, 222, 223 and 224. At box 214, the desired throttle opening degree θ*(n) increased toward 100% by the amount Δθ. Thus, it will be appreciated that the throttle 44 is returned at a gradual rate toward the fully open position, i.e., 100%, after completion of the drive torque control mode.

Assuming now that, during the drive torque control mode, there occurs a change of angle of inclination, this change causes a change of the accelerateing resistance torque $T_X$, causing the corresponding change of the feedforward term $T_{FF}$ since the running resistance $T_{R(n)}$ remain unchanged over the whole range of the drive torque control mode. This change of the feedforward term $T_{FF}$ induces a change of the slip error ΔS, causing a change of the feedback term $T_{FB(n)}$. The direction of this change of the feedback term $T_{FB(n)}$ is opposite to the direction of the change of the feedforward term $T_{FB}$. Thus, the desired engine torque $T_E^*$ is appropriately adjusted to the change of the running resistance owing to the change of angle of inclination.

In the preferred implementation of the present invention, the running resistance torque $T_{R(n)}$ remains unaltered during the drive torque control mode. If the running resistance torque $T_{R(n)}$ as expressed by the equation (6) is used in determining the feedforward term $T_{FF}$ in the drive torque control mode, the desired engine torque $T_E^*$ can be altered depending on variation in the running resistance during the drive torque control mode.

What is claimed is:

1. An automotive vehicle having an accelerator, comprising:

an engine operable by manipulating the accelerator to output varying engine torque, drive wheels drivingly connected to the engine so that drive torque derived from the engine torque is imparted to the drive wheels, an engine torque modifier operable in response to an engine torque modifier signal to change an instantaneous value of the engine torque to a desired value, and a traction controller that determines the desired value of the engine torque to adjust an instantaneous slip amount of the drive wheels to a desired slip amount and to develop the engine torque modifier signal when the vehicle is in a drive torque control mode, wherein the traction controller determines:

a value of running resistance torque that has taken place immediately before initiation of the drive torque control mode, and during the drive torque control mode, the desired value of the engine torque as a function of the determined value of running resistance and a current value of accelerating resistance torque.

2. An automotive vehicle having an accelerator, comprising:

an engine operable by manipulating the accelerator to output varying engine torque, drive wheels drivingly connected to the engine so that drive torque derived from the engine torque is imparted to the drive wheels, an engine torque modifier operable in response to an engine torque modifier signal to change an instantaneous value of the engine torque, and a traction controller that determines a desired value of the engine torque for accomplishing a desired slip amount when the vehicle is in a drive torque control mode and to develop the engine torque modified signal for operating the engine torque modifier to adjust an instantaneous value of the engine torque to the determined desired value, wherein the traction controller determines:

the drive torque as a function of the instantaneous value of the engine torque, a longitudinal acceleration to which the vehicle is subject to, an acceleration resistance torque as a function of said determined longitudinal acceleration, a running resistance torque by substracting the accelerating resistance torque from the drive torque immediately before initiation of the drive torque control mode and setting the result of the subtraction as the running resistance torque, and the desired value of the engine torque as a function of the running resistance torque and the accelerating resistance torque during drive torque control mode.

3. An automotive vehicle as claimed in claim 2, wherein the controller determines an instantaneous value of slip amount at the drive wheels of the vehicle;

compares said determined instantaneous value of slip amount with a predetermined reference value;

determines initiation of the drive torque control mode immediately after said determined instantaneous value of slip amount has exceeded said predetermined reference value;

determines a slip error between said determined instantaneous value of slip amount and a desired value of slip amount that is less that of said predetermined reference value;

determines a feedback term of the desired value of the engine torque as a function of said determined slip error;

computes a sum of the running resistance torque and the accelerating resistance torque and sets the result as a feedforward term of the desired value of the engine torque;

computes a sum of the feedforward term and the feedback term;

determines the desired value of the engine torque as a function of the sum of the feedforward term and the feedback term;

determines a desired value of the engine operating variable as a function of the desired value of engine torque;

compares the desired value of the engine operating variable with an instantaneous current value of the engine operating variable;

determines the engine torque modifier signal in response to the compared result; and applies the engine torque modifier signal to the engine torque modifier.

4. An automotive vehicle as claimed in claim 3, wherein said accelerating resistance torque $T_X$ is expressed as:

$$T_X = W \cdot R \{1 + I \cdot g(W \cdot R^2) - 1\} X g \cdot g^{-1}$$

where W: Weight of vehicle;
R: Rolling radius of drive wheel;
I: Drivetrain inertia moment;
g1: Gravitational acceleration;
Xg: Longitudinal acceleration.

5. An automotive vehicle as claimed in claim 3, wherein the controller further determines;

the instantaneous value of the engine torque as a function of the operator manipulation of the accelerator and a current value of the engine speed;

the drive torque as a function of the determined instantaneous value of engine torque.

6. An automotive vehicle comprising:

an engine having a variable engine speed, an accelerator, an air intake pipe, and a first throttle disposed in the air intake pipe and openable in degrees by manipulating the accelerator, drive wheels, a transmission having an input shaft drivingly connected to the engine and an output shaft drivingly connected to the drive wheels, the transmission having a ratio controller that establishes various speed ratios between said input and output shafts of the transmission in response to a speed ratio control signal, a transmission controller that develops the speed ratio control signal, an engine torque modifier, which includes a second throttle disposed in the air intake pipe upstream of the first throttle, responsive to an engine torque modifier signal to adjust an opening degree of the second throttle, and a traction controller that develops the engine torque modifier signal after initiation of a drive torque control mode until completion thereof, wherein the traction controller:

determines a longitudinal acceleration to which the vehicle is subject to;

calculates an accelerating resistance torque as a function of said determined longitudinal acceleration;

determines an engine torque of the engine as a function of the operator manipulation of the accelerator and the engine speed;

calculates a drive torque as a function of said determined engine torque and a speed ratio in the transmission;

calculates a subtraction of said calculated accelerating resistance torque from said calculated drive torque immediately before the initiation of the drive torque control mode and setting the result as a running resistance torque;

calculates a sum of said calculated accelerating resistance torque and said running resistance torque that has been set immediately before the initiation of the drive torque control mode and sets the result as a feedforward term of a desired value of the engine torque;

determines a slip error from a desired value of slip of the drive wheels;

calculates a feedback term of the engine torque as a function of said determined slip error;

calculates the desired value of engine torque as a function of said feedforward term, said feedback term, and said speed ratio in the transmission;

determines a desired value of opening degree of the second throttle as a function of the desired value of engine torque and the engine speed;

determines a current value of opening degree of the second throttle;

compares said desired value of opening degree of the second throttle with the current value of opening degree of the second throttle;

determines the engine torque modifier signal in response to result of comparison of said desired value of opening degree of the second throttle with the current value of opening degree of the second throttle for moving the second throttle of the engine torque modifier to reduce a deviation of said current value from said desired value toward zero.

\* \* \* \* \*